(12) United States Patent (10) Patent No.: US 8,868,418 B2
Konchitsky et al. (45) Date of Patent: Oct. 21, 2014

(54) RECEIVER INTELLIGIBILITY ENHANCEMENT SYSTEM

(76) Inventors: Alon Konchitsky, Santa Clara, CA (US); Sandeep Kulakcherla, Santa Clara, CA (US); Alberto D. Berstein, Cupertino, CA (US)

( * ) Notice: Subject to any disclaimer, the term of this patent is extended or adjusted under 35 U.S.C. 154(b) by 1006 days.

(21) Appl. No.: 12/951,027

(22) Filed: Nov. 20, 2010

(65) Prior Publication Data

US 2011/0066427 A1 Mar. 17, 2011

Related U.S. Application Data

(63) Continuation-in-part of application No. 12/139,489, filed on Jun. 15, 2008, now abandoned, and a continuation-in-part of application No. 12/705,296, filed on Feb. 12, 2010, now abandoned, and a continuation-in-part of application No. 12/941,827, filed on Nov. 8, 2010, which is a continuation-in-part of application No. 12/139,489, filed on Jun. 15, 2008, now abandoned, application No. 12/951,027, which is a continuation-in-part of application No. 12/946,468, filed on Nov. 15, 2010.

(60) Provisional application No. 60/944,180, filed on Jun. 15, 2007.

(51) Int. Cl.
*G10L 15/20* (2006.01)
*G10L 21/0208* (2013.01)
*H04R 3/00* (2006.01)
*G10L 21/00* (2013.01)

(52) U.S. Cl.
CPC ............. *G10L 21/0208* (2013.01); *G10L 21/00* (2013.01); *G10L 15/20* (2013.01); *H04R 3/005* (2013.01)
USPC .......................................... 704/233; 704/266

(58) Field of Classification Search
CPC ................................ G10L 15/20; G10L 21/00
USPC ................ 704/226, 233; 379/406.03, 406.07, 379/406.08; 381/94.2
See application file for complete search history.

(56) References Cited

U.S. PATENT DOCUMENTS

| 5,524,148 | A  | * | 6/1996  | Allen et al. ................... 379/391 |
|-----------|----|---|---------|------------------------------------------|
| 5,615,256 | A  | * | 3/1997  | Yamashita ............... 379/390.01      |
| 5,742,927 | A  | * | 4/1998  | Crozier et al. ................ 704/226   |
| 6,175,602 | B1 | * | 1/2001  | Gustafsson et al. .......... 375/346      |
| 6,510,224 | B1 | * | 1/2003  | Christensson et al. ... 379/406.03        |
| 6,766,292 | B1 | * | 7/2004  | Chandran et al. ............ 704/224      |
| 2002/0172350 | A1 | * | 11/2002 | Edwards et al. ......... 379/392.01    |
| 2004/0101038 | A1 | * | 5/2004 | Etter ............................. 375/222 |
| 2005/0004796 | A1 | * | 1/2005 | Trump et al. ................. 704/225  |
| 2005/0141737 | A1 | * | 6/2005 | Hansen ......................... 381/316 |
| 2006/0270467 | A1 | * | 11/2006 | Song et al. ................... 455/570  |
| 2009/0111507 | A1 | * | 4/2009 | Chen .......................... 455/550.1 |
| 2009/0281805 | A1 | * | 11/2009 | LeBlanc et al. ............... 704/233  |

* cited by examiner

*Primary Examiner* — Jialong He
(74) *Attorney, Agent, or Firm* — Steven A. Nielsen; Allman & Nielsen, P.C.

(57) ABSTRACT

Embodiments of the invention provide a communication device and methods for enhancing audio signals. A first audio signal buffer and a second audio signal buffer are acquired. Thereafter, the magnitude spectrum calculated from the Fast Fourier Transform (FFT) of the second audio signal is processed based on the Linear Predictive Coding (LPC) spectrum of the first audio signal to generate an enhanced second audio signal.

7 Claims, 9 Drawing Sheets

RECEIVER INTELLIGIBILITY ENHANCEMENT SYSTEM

CROSS REFERENCE TO RELATED APPLICATIONS

This application is a Continuation-In-Parts application of a U.S. Non-Provisional application Ser. No. 12/139,489 entitled 'Receiver Intelligibility Enhancement System' and filed on Jun. 15, 2008, which in turn claims a priority date of Jun. 15, 2007 from application 60/994,180. This application is also a CIP of application Ser. No. 12/705,296 filed on Feb. 12, 2010. This application is also a CIP of application Ser. No. 12/941,827 filed on Nov. 8, 2010 which in turn is a CIP of application Ser. No. 12/139,489. The entire teachings of the above referenced applications are incorporated herein by reference.

FIELD OF THE INVENTION

The invention relates to audio signal processing, and more specifically, the invention relates to systems and methods for enhancing receiver intelligibility.

BACKGROUND

Speech intelligibility is usually expressed as a percentage of words, sentences or phonemes correctly identified by a listener or a group of listeners. It is an important measure of the effectiveness or adequacy of a communication system or of the ability of people to communicate effectively in noisy environments.

Communication devices such as mobile phones, headsets, telephones and so forth may be used in vehicles or in other areas where there is often a high level of background noise. A high level of local background noise can make it difficult for a user of the communication device to understand the speech being received from the receiving side in the communication network. The ability of the user to effectively understand the speech received from the receiver side is obviously essential and is referred to as the intelligibility of the received speech.

In the past, the most common solution to overcome the background noise was to increase the volume at which the speakers of communication device output speech. One problem with this solution is that the maximum output sound level that a phone's speaker can generate is limited. Due to the need to produce cost-competitive cell phones, companies often use low-cost speakers with limited power handling capabilities. The maximum sound level such phone speakers generate is often insufficient due to high local background noise.

Attempts to overcome the local background noise by simply increasing the volume of the speaker output can also result in overloading the speaker. Overloading the loudspeaker introduces distortion to the speaker output and further decreases the intelligibility of the outputted speech. A technology that increases the intelligibility of speech received irrespective of the local background noise level is needed.

Several attempts to improve the intelligibility in communication devices are known in the related art. The requirements of an intelligent system cover naturalness of the enhanced signal, short signal delay and computational simplicity.

During the past two decades, Linear Predictive Coding (LPC) has become one of the most prevalent techniques for speech analysis. In fact, this technique is the basis of all the sophisticated algorithms that are used for estimating speech parameters, for example, pitch, formants, spectra, vocal tract and low bit representations of speech. The basic principle of linear prediction states that speech can be modeled as the output of a linear time-varying system excited by either periodic pulses or random noise. The most general predictor form in linear prediction is the Auto Regressive Moving Average (ARMA) model where a speech sample of 's (n)' is predicted from 'p' past predicted speech samples s (n−1), ..., s(n−p) with the addition of an excitation signal u(n) according to the following equation 1:

$$s(n) = \sum_{k=1}^{p} a_k s(n-i) + G \sum_{l=0}^{q} b_l u(n-l) \qquad \text{Equation 1}$$

where G is the gain factor for the input speech and $a_k$ and $b_l$ are filter coefficients. The related transfer function H (z) is given by following equation 2:

$$H(z) = \frac{S(z)}{U(z)} \qquad \text{Equation 2}$$

For an all-pole or Autoregressive (AR) model, the transfer function becomes as the following equation 3:

$$H(z) = \frac{1}{1 - \sum_{k=1}^{p} a_k z^{-k}} = \frac{1}{A(z)} \qquad \text{Equation 3}$$

Estimation of LPC

Two widely used methods for estimating the LP coefficients exist: autocorrelation method and covariance method. Both methods choose the LP coefficients $a_k$ in such a way that the residual energy is minimized. The classical least squares technique is used for this purpose. Among different variations of LP, the autocorrelation method of linear prediction is the most popular. In this method, a predictor (an FIR of order m) is determined by minimizing the square of the prediction error, the residual, over an infinite time interval. Popularity of the conventional autocorrelation method of LP is explained by its ability to compute a stable all-pole model for the speech spectrum, with a reasonable computational load, which is accurate enough for most applications when presented by a few parameters. The performance of LP in modeling of the speech spectrum can be explained by the autocorrelation function of the all-pole filter, which matches exactly the autocorrelation of the input signal between 0 and m when the prediction order equals m. The energy in the residual signal is minimized. The residual energy is given by the following equation 4:

$$E = \sum_{n=-\infty}^{\infty} e^2(n) = \sum_{n=-\infty}^{\infty} \left( s_N(n) - \sum a_k s_N(n-k) \right)^2 \qquad \text{Equation 4}$$

The covariance method is very similar to the autocorrelation method. The basic difference is the length of the analysis window. The covariance method windows the error signals instead of the original signal. The energy E of the windowed error signal is given by following equation 5:

$$E = \sum_{n=-\infty}^{\infty} e^2(n) = \sum_{n=-\infty}^{\infty} e^2(n)w(n) \quad \text{Equation 5}$$

Comparing autocorrelation method and covariance method, the covariance method is quite general and can be used with no restrictions. The only problem is that of stability of the resulting filter, which is not a severe problem generally. In the autocorrelation method, on the other hand, the filter is guaranteed to be stable, but the problems of parameter accuracy can arise because of the necessity of windowing the time signal. This is usually a problem if the signal is a portion of an impulse response.

Usually in environments with significant local background noise, the signal received from the receiving side becomes unintelligible due to a phenomenon called masking. There are several kinds of masking, including but not limited to, auditory masking, temporal masking, simultaneous masking and so forth.

Auditory masking is a phenomenon when one sound is affected by the presence of another sound. Temporal masking is a phenomenon when a sudden sound makes other sounds inaudible. Simultaneous masking is the inability of hearing a sound in presence of other sound whose frequency component is very close to desired sound's frequency component.

In light of the above discussion, techniques are desirable for enhancing receiver intelligibility.

SUMMARY

The present invention provides a communication device and method for enhancing audio signals. The communication device may monitor the local background noise in the environment and enhances the received communication signal in order to make the communication more relaxed. By monitoring the ambient or environmental noise in the location in which the communication device is operating and applying receiver intelligibility enhancement processing at the appropriate time, it is possible to significantly improve the intelligibility of the received communication signal.

In one aspect of the invention, the noise in the background in which the communication device is operating is monitored and analyzed.

In another aspect of the invention, the signals from a far-end are modified based on the characteristics of the background noise at near end.

In another aspect of the invention, Linear Predictive Coding (LPC) spectrum of a first audio signal buffer acquired from a near-end are used to modify the magnitude spectrum calculated from the Fast Fourier Transform (FFT) spectrum of a second audio signal buffer acquired from a far-end to generate an intelligibility enhanced second audio signal.

BRIEF DESCRIPTION OF THE DRAWINGS

Figure 1:
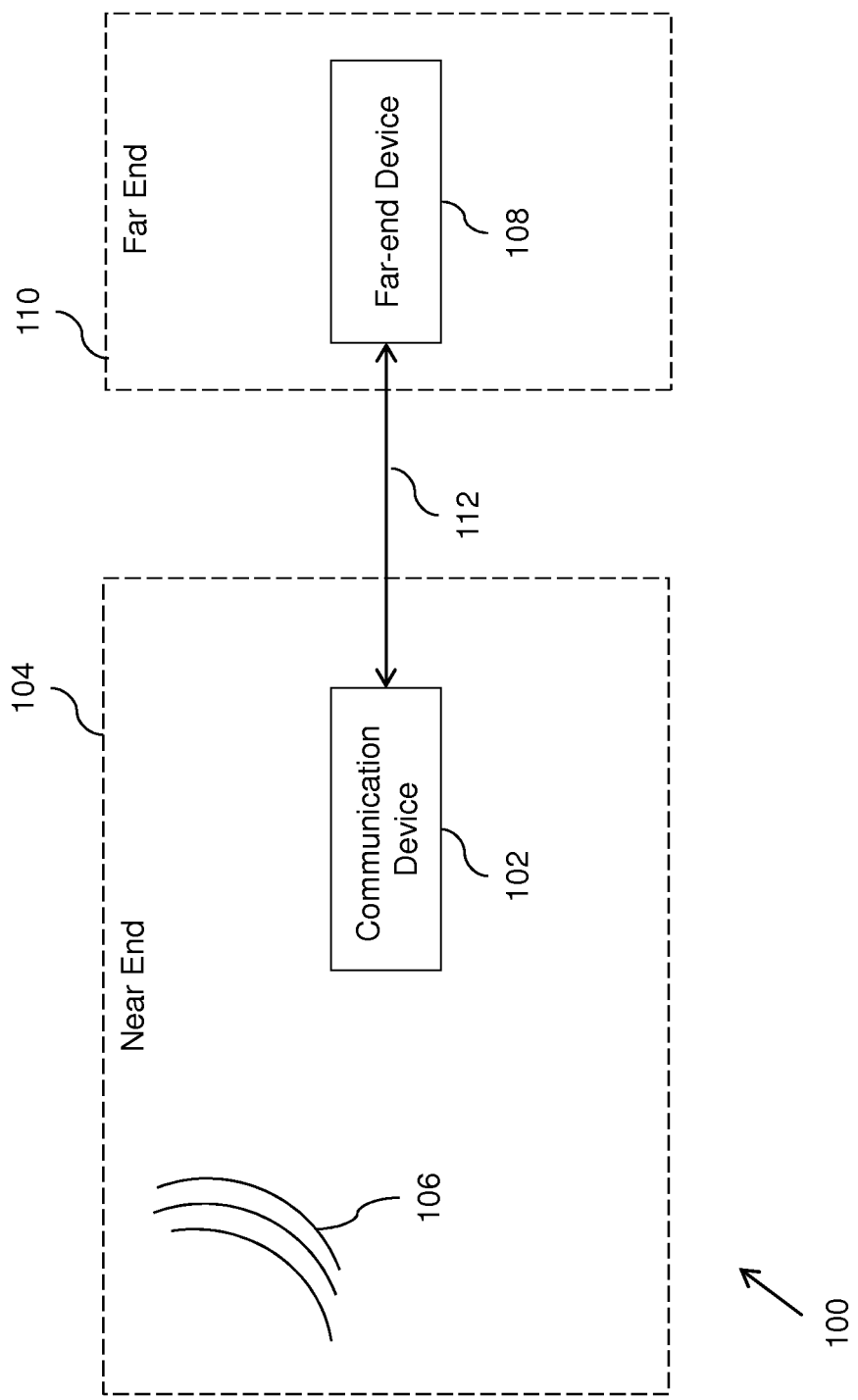
Figure 2:
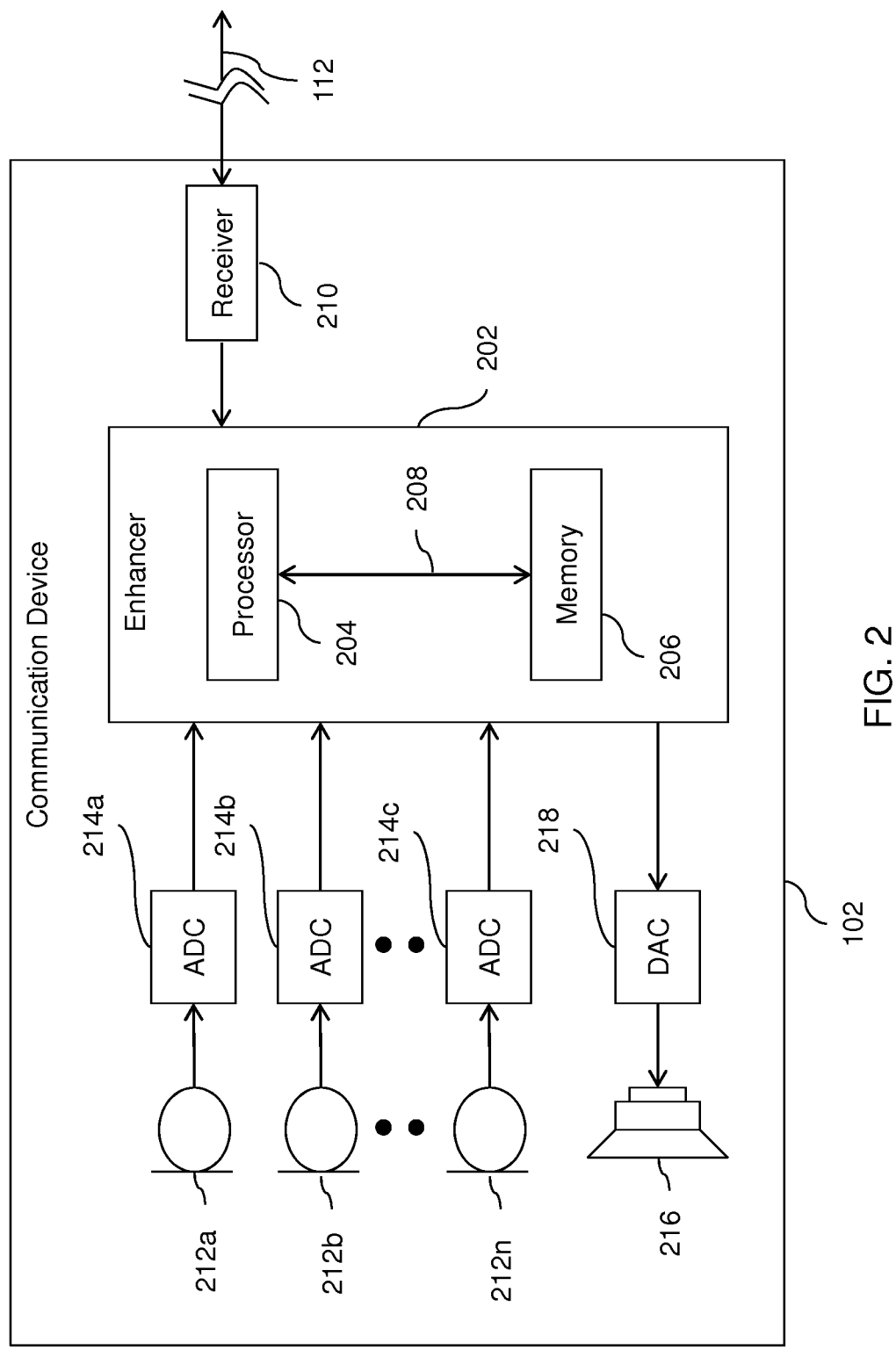
Figure 3:
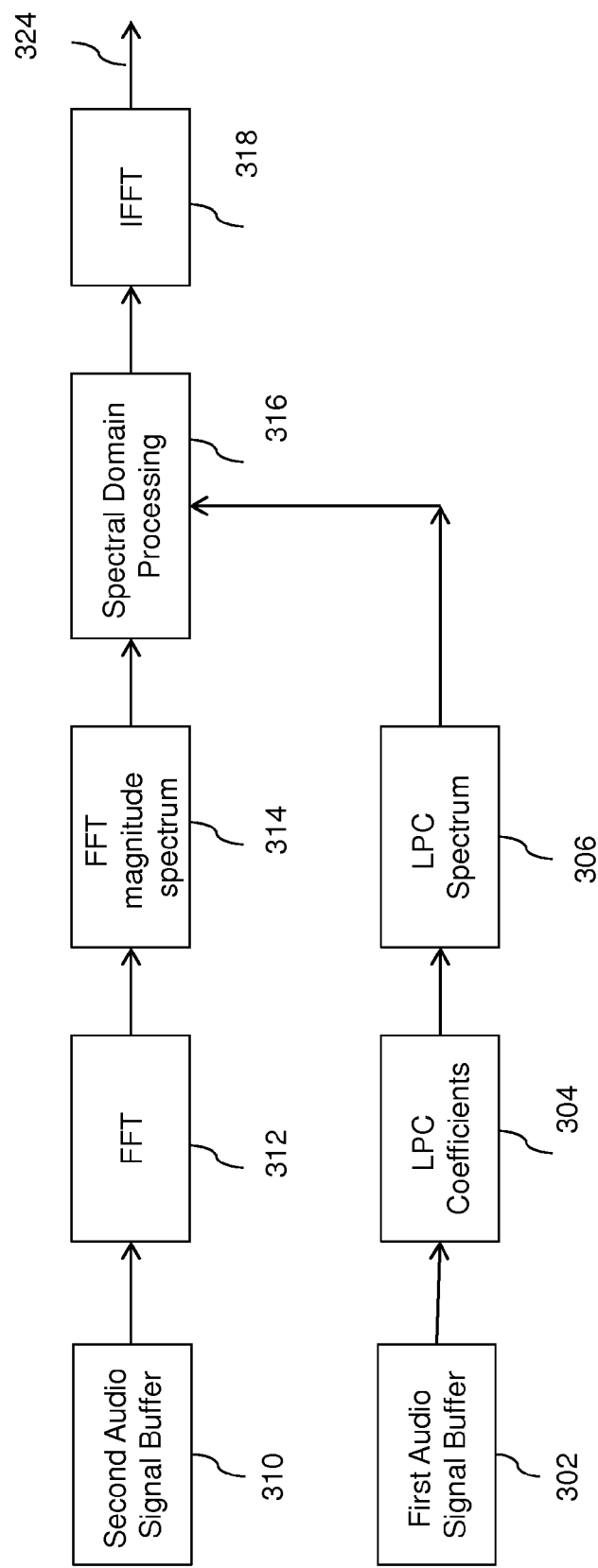
Figure 4:
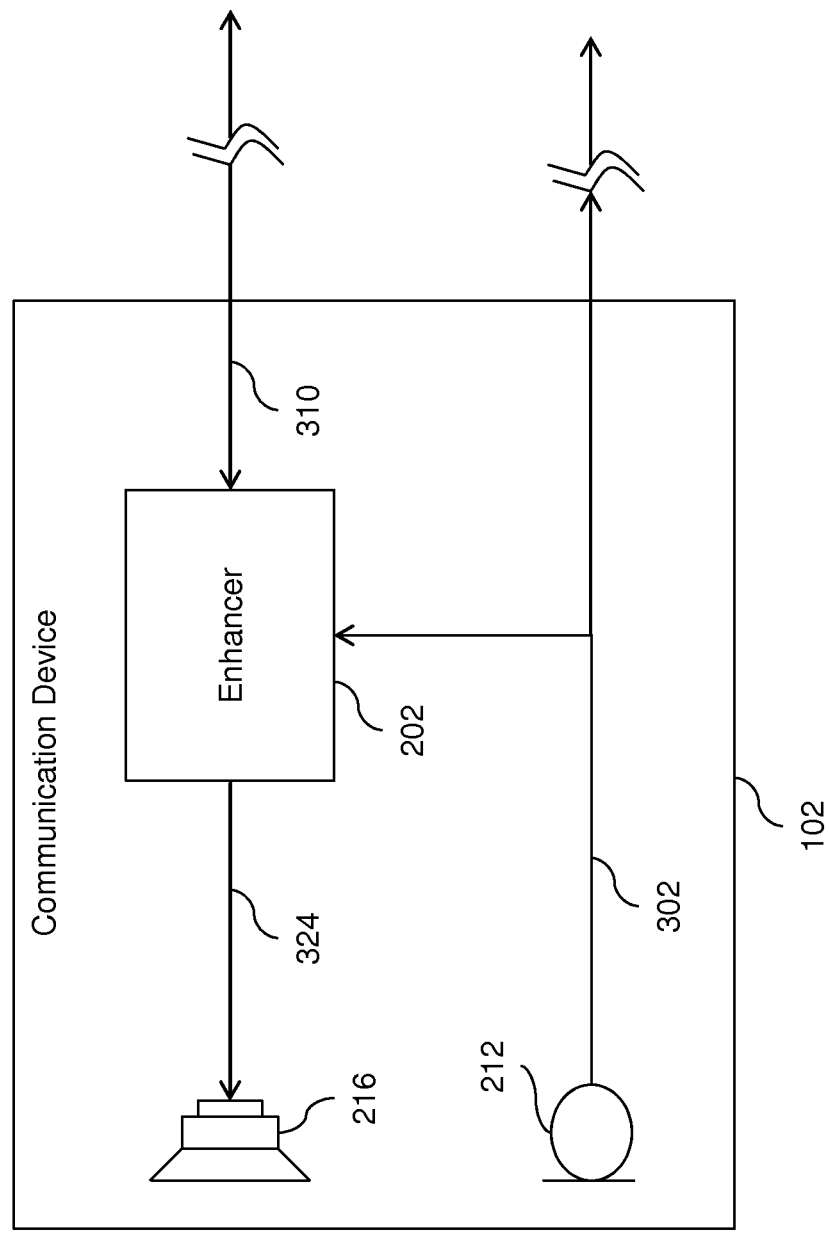
Figure 5:
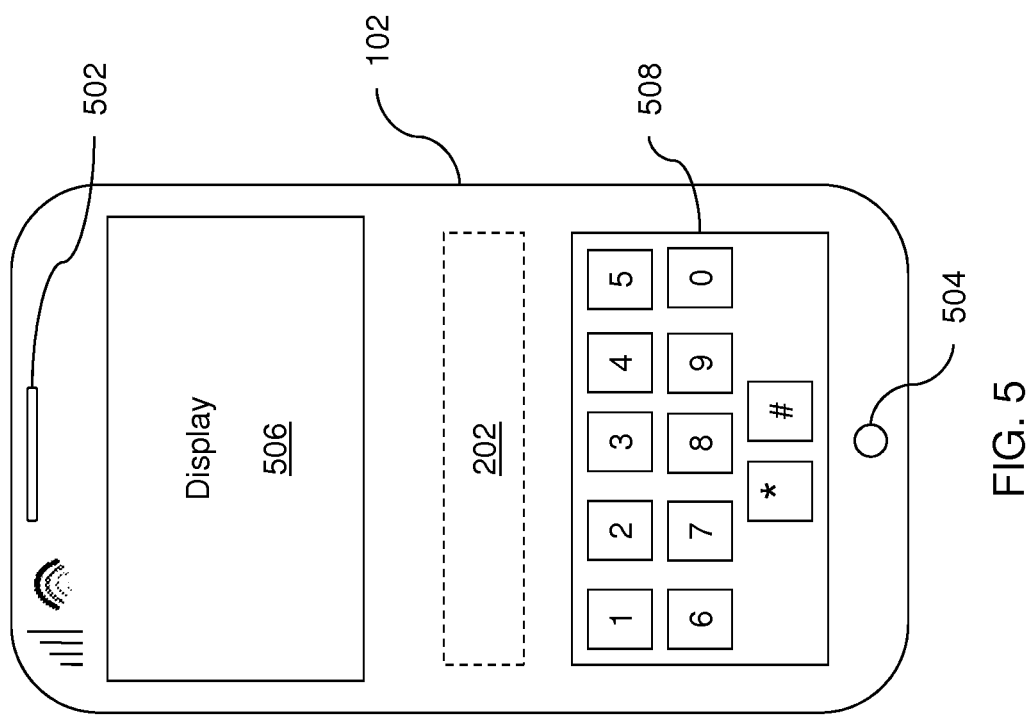
Figure 6:
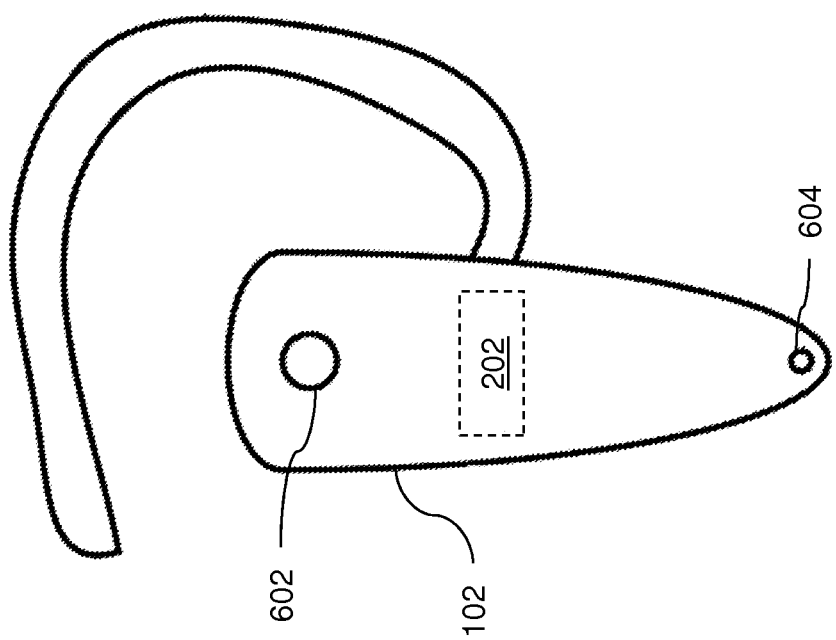
Figure 7:
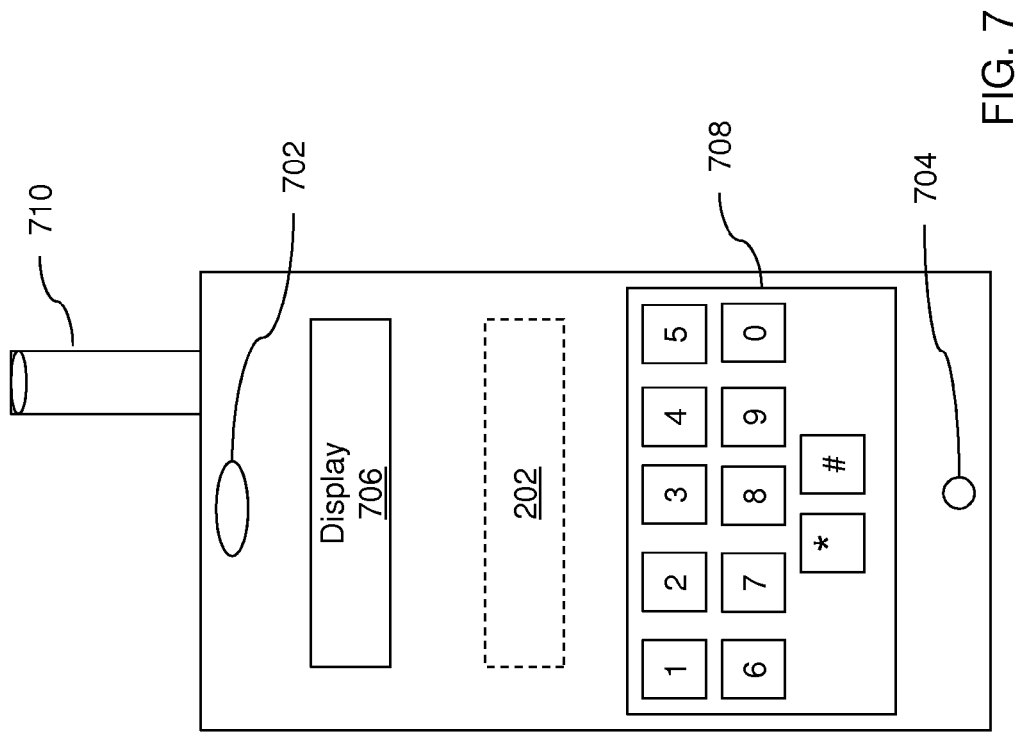
Figure 8A:
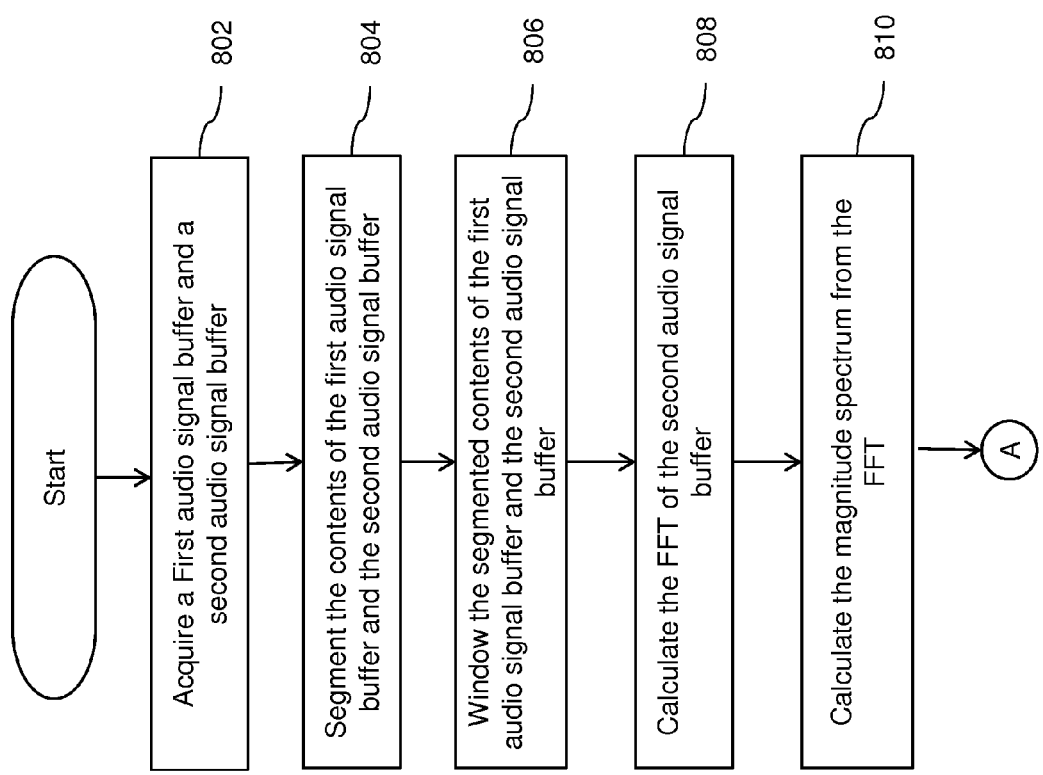
Figure 8B:
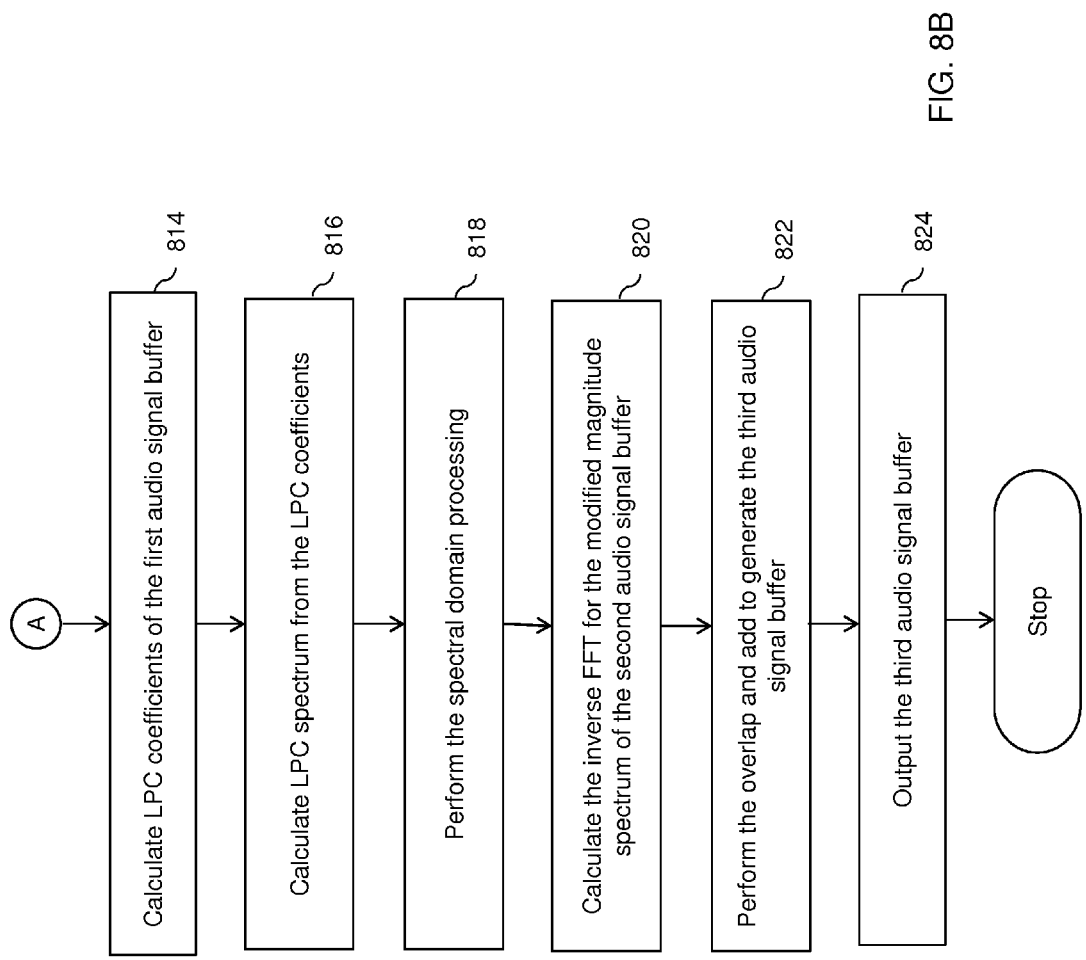

Having thus described the invention in general terms, reference will now be made to the accompanying drawings, which are not necessarily drawn to scale, and wherein:

FIG. 1 illustrates an environment where various embodiments of the invention function;

FIG. 2 illustrates a block diagram of a communication device for enhancing audio signals, in accordance with an embodiment of the invention;

FIG. 3 is a flow diagram illustrating processing of audio signals, in accordance with an embodiment of the invention;

FIG. 4 illustrates acquiring and outputting of audio signals by the communication device, in accordance with an embodiment of the invention;

FIG. 5 illustrates the communication device as a mobile phone, in accordance with an embodiment of the invention;

FIG. 6 illustrates the communication device as a headset, in accordance with an embodiment of the invention;

FIG. 7 illustrates the communication device as a cordless phone, in accordance with an embodiment of the invention; and FIG. 8 is a flowchart illustrating enhancing of audio signal, in accordance with an embodiment of the invention.

DETAILED DESCRIPTION OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout. Unless otherwise noted in this specification or in the claims, all of the terms used in the specification and the claims will have the meanings normally ascribed to these terms by workers in the art.

The present invention provides a novel and unique technique to improve the intelligibility in noisy environments experienced in communication devices such as a cellular telephone, wireless telephone, cordless telephone, and so forth. While the present invention has applicability to at least these types of communications devices, the principles of the present invention are particularly applicable to all types of communications devices, as well as other devices that process speech in noisy environments such as voice recorders, dictation systems, voice command and control systems, and the like. For simplicity, the following description may employ the terms "telephone" or "cellular telephone" as an umbrella term to describe the embodiments of the present invention, but those skilled in the art will appreciate that the use of such term is not to be considered limiting to the scope of the invention, which is set forth by the claims appearing at the end of this description.

FIG. 1 illustrates an environment 100 where various embodiments of the invention function. A communication device 102 may communicate with a far-end device 108 through a communication channel 112. Examples of communication device 102 and far-end device 108 include, but are not limited to, a mobile phone, a telephone, a cordless phone, a Bluetooth headset, a computer, a dictation system, voice recorders and other devices capable of communication. Communication channel 112 may be for example, a wireless channel, a radio channel, a wired channel and so forth. Communication device 102 and far-end device 108 communicate by exchanging signals over communication channel 112. Far-end device 108 may be located at a far end 110 from communication device 102, while communication device 102 may be located at a near end 104. Far end 110 may be location that is distant from near end 104 of communication device 102. For example, near end 104 may be a restaurant having local background noise 106 and far end 110 may be a home or office. Background noise 106 may be due to talking of other people, machines or devices used inside or near the restaurant.

Generally in conventional devices the signals received from far-end device 108 and outputted through an earpiece of the communication device 102 may not sound clear because of the background noise 106. The present invention provides techniques to generate and output clear and enhanced signals from the earpiece of communication device 102.

FIG. 2 illustrates a block diagram of communication device 102 for enhancing audio signals, in accordance with an embodiment of the invention. Communication device 102 may include multiple microphones 212*a-n* for acquiring audio signals. The audio signals acquired by microphones 212*a-n* may be analog and can be converted to digital audio signals by Analog-To-Digital (ADC) convertors 214*a-n* connected to microphones 212*a-n*. Microphones 212*a-n* may acquire audio signals from near end 104 of communication device 102. Therefore, the audio signals acquired by microphones 212*a-n* may include background noise. Although, multiple microphones 212*a-n* are shown, a person skilled in the art will appreciate that the present invention can function with a single microphone implemented in communication device 102.

A Digital-To-Analog (DAC) convertor 218 connected to an earpiece 216 may convert digital audio signals to analog audio signals that may then be outputted by earpiece 216. Further, communication device 102 includes a receiver 210 that receives signals from a far-end device on communication channel 112. An enhancer 202 processes the signals received from microphones 212*a-n* and receiver 210 to enhance the signal received from receiver 210. Further, the enhanced signal is outputted from earpiece 216. Enhancer 202 may include a processor 204 and a memory 206. Processor 204 can be a general purpose fixed point or floating point Digital Signal Processor (DSP), or a specialized DSP (fixed point or floating point). Examples of processor 204 include, but are not limited to, processor Texas Instruments (TI) TMS320VC5510, TMS320VC6713, TMS320VC6416; Analog Devices (ADI) BlackFinn (BF) 531, BF532, 533; Cambridge Silicon Radio (CSR) Blue Core 5 Multi-media (BC5-MM) or Blue Core 7 Multi-media BC7-MM and so forth. Memory 206 can be for example, a Random Access Memory (RAM), SRAM (Static Random Access Memory), a Read Only Memory (ROM), a solid state memory, a computer readable media and so forth. Further, memory 206 may be implemented inside or outside communication device 102. Memory 206 may include instructions that can be executed by processor 204. Further, memory 206 may store data that may be used by processor 204. Processor 204 and memory 206 may communicate for data transfer through system bus 208.

FIG. 3 is a flow diagram illustrating processing of audio signals, in accordance with an embodiment of the invention. Background noise 106 acquired by microphones 212*a-n* may be converted to digital first audio signal buffer 302. Similarly, audio signals received from far end 110 may be processed as second audio signal buffer 310. The audio signals received from far end 110 can be speech signals. In an embodiment of the invention, background noise 106 and audio signals received from far end 110 may be stored as digital first audio signal buffer 302 and second audio signal buffer 310 respectively in memory 206 for processing. Further, the contents of first audio signal buffer 302 and second audio signal buffer 310 may be segmented and windowed for processing. In an embodiment of the invention, the segmentation is done by using a Hanning window. However people skilled in the art can appreciate the fact that the other windowing schemes, such as Hamming window, Blackman-Harris window, trapezoidal window and so forth, can also be used.

The LPC coefficients are calculated based on the components of first audio signal buffer 302. In an embodiment of the invention, the LPC coefficients may be calculated using Durbin-Levinson method.

However, people skilled in the art will appreciate that other techniques such as covariance method, autocorrelation method or other methods may be used to calculate the LPC coefficients. The LPC spectrum is calculated based on the LPC coefficients.

The FFT of the second audio signal buffer 310 may be calculated at block 312. N point FFT may be used (N≥128). The magnitude spectrum of the FFT may be calculated at block 314. Block 316 performs the spectral domain processing, wherein selective frequencies of the second audio signal buffer are boosted by at least 3 decibels (dB). The difference between the LPC spectrum and FFT magnitude spectrum, for all the N points, may be calculated. If the difference is more than K dB (K≥5), the frequencies of the second audio signal buffer are boosted by at least 3 dB. !!!

The third audio signal buffer 324 is an enhanced audio signal that may be converted from digital to analog and outputted from earpiece 216 of communication device 102.

In an embodiment of the invention first audio signal buffer 302, the second audio signal buffer 310 and the third audio signal buffer 324 may be stored in memory 206 for processing by processor 204.

FIG. 4 illustrates acquiring and outputting of audio signals by communication device 102, in accordance with an embodiment of the invention. As shown, first audio signal buffer 302 is acquired from microphone 212 and second audio signal buffer 310 is received from far-end device 108. Communication device 102 transmits signals to far-end device 108 based on first audio signal buffer 302.

First audio signal buffer 302 and second audio signal buffer 310 are processed by enhancer 202 to generate third audio signal buffer 324. The third audio signal buffer 324 may be converted from digital to analog and outputted from earpiece 216 of communication device 102. The third audio signal buffer 324 is an enhanced form of second audio signal buffer 310 that sounds clear to the user of communication device 102 even in presence of background noise 106.

FIG. 5 illustrates communication device 102 as a mobile phone, in accordance with an embodiment of the invention. As shown, communication device 102 may include an earpiece 502, a microphone 504, a display 506, a keypad 508, and enhancer 202. Further, mobile phone may communicate to another device through a mobile network. Microphone 504 acquires first audio signal buffer 302 and second audio signal buffer 310 is received from the other device on the mobile network. Although a single microphone 504 is shown, a person skilled in the art will appreciate that the mobile phone may include multiple microphones. Enhancer 202 processes first audio signal buffer 302 and second audio signal buffer 310 to generate an enhanced signal that is outputted from earpiece 502. In an embodiment of the invention, communication device 102 may include a switch (not shown) to activate and/or deactivate enhancer 202. Therefore, once enhancer 202 is deactivated, first audio signal buffer 302 and second audio signal buffer 310 are not processed and signal received from a far end device is outputted from earpiece 502.

FIG. 6 illustrates communication device 102 as a headset, in accordance with an embodiment of the invention. Communication device 102 may be a Bluetooth headset that can be coupled with a device such as a mobile phone. As shown, the headset may include an earpiece 602, a microphone 604 and enhancer 202. Microphone 604 acquires first audio signal buffer 302 and second audio signal buffer 310 is received from the other device on radio or wireless channel. Although a single microphone 604 is shown, a person skilled in the art will appreciate that the mobile phone may include multiple microphones. Enhancer 202 processes first audio signal buffer 302 and second audio signal buffer 310 to generate an enhanced signal that is outputted from earpiece 602. In an embodiment of the invention, communication device 102 may include a switch (not shown) to activate and/or deactivate enhancer 202. Therefore, once enhancer 202 is deactivated, first audio signal buffer 302 and second audio signal buffer 310 are not processed and signal received from a far end device is outputted from earpiece 602.

FIG. 7 illustrates communication device 102 as a cordless phone, in accordance with an embodiment of the invention. As shown, the cordless may include an earpiece 702, a microphone 704, a display 706, a keypad 708, an antenna 710 and enhancer 202. The cordless phone may communicate with a far end device through a docking station (not shown) by using antenna 710. Microphone 704 acquires first audio signal buffer 302 and second audio signal buffer 310 is received from the other device on radio or wireless channel. Although a single microphone 704 is shown, a person skilled in the art will appreciate that the mobile phone may include multiple microphones. Enhancer 202 processes first audio signal buffer 302 and second audio signal buffer 310 to generate an enhanced signal that is outputted from earpiece 702. In an embodiment of the invention, earpiece 702 may include a loudspeaker.

In an embodiment of the invention, communication device 102 may include a switch (not shown) to activate and/or deactivate enhancer 202. Therefore, once enhancer 202 is deactivated, first audio signal buffer 302 and second audio signal buffer 310 are not processed and signal received from a far end device is outputted from earpiece 702.

FIG. 8 is a flowchart illustrating enhancing of audio signal, in accordance with an embodiment of the invention. Communication device 102 may communicate with far-end device 108 over communication channel 112. However, communication device 102 may be present at a location having background noise. Therefore, the signals received from far-end device 108 may required to be enhanced to make them clear and audible. At step 802, first audio signal buffer 302 is acquired from microphones 212a-n and second audio signal buffer 310 is acquired from far-end device 108. Thereafter, at step 804, the contents of first audio signal buffer 302 and second audio signal buffer 310 are segmented. At step 806, the segmented contents of first audio signal buffer 302 and second audio signal buffer 310 are windowed. In an embodiment of the invention, the segmented contents are windowed based on Hanning window. Thereafter, at step 808, the Fast Fourier Transform (FFT) of the second audio signal buffer is calculated. Thereafter, at step 810, the magnitude spectrum is calculated from the FFT of the second audio signal buffer.

Further at step 814, the Linear Prediction Coding (LPC) coefficients of the first audio signal buffer are calculated. Thereafter, at step 816, the LPC spectrum is calculated from the LPC coefficients. In an embodiment of the invention, steps 808, 814 and 810, 816 may be performed simultaneously. At step 818, spectral domain processing may be performed wherein selective frequencies of the second audio signal buffer are boosted by at least 3 decibels (dB). The difference between the LPC spectrum and FFT magnitude spectrum is calculated for all N points of the FFT (N≥128). If the difference is more than K dB (K≥5), the frequencies of the second audio signal buffer are boosted by at least 3 dB. Thereafter, at step 820, the inverse FFT may be calculated. Further, at step 822, overlap and add method is performed for the second audio signal buffer to generate the third audio signal buffer 824. Subsequently, third audio signal buffer 324 may be converted from digital to analog and outputted from earpiece 216 of communication device 102.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A communication device for generating enhanced audio signals, the communication device comprising:
    an earpiece configured to output audio signals;
    at least one microphone configured to acquire a first audio signal buffer, wherein the first audio signal buffer comprises a noise signal;
    a receiver configured to receive a second audio signal buffer, wherein the second audio signal buffer comprises a speech signal received through a communication channel; and
    a processor configured to:
        segment contents of the first audio signal buffer and the second audio signal buffer, the first audio signal buffer being continuously monitored and analyzed;
        window the segmented contents of the first audio signal buffer and the second audio signal buffer;
        calculate Linear Prediction Coding (LPC) coefficients of the first audio signal buffer;
        calculate a LPC spectrum from the LPC coefficients;
        calculate Fast Fourier Transform (FFT) of the second audio signal buffer;
        calculate a FFT magnitude spectrum of the second audio signal buffer;
        calculate a difference between the LPC spectrum and the FFT magnitude spectrum;
        selectively boost frequencies of the second audio signal buffer by at least 3 decibels (dB) when the difference is greater than 5 dB to modify the FFT magnitude spectrum of the second audio signal buffer;
    calculate an inverse FFT of the modified magnitude spectrum of the second audio signal buffer; and
    overlap and add the second audio signal buffer to generate a third audio signal buffer, wherein the third audio signal buffer is outputted by the earpiece,
    and wherein a memory is configured to store one or more of the first audio signal buffer, the second audio signal buffer, and the third audio signal buffer.

2. The communication device of claim 1, wherein the memory is further configured to store one or more instructions executable by the processor.

3. The communication device of claim 1, wherein the processor is configured to window the segmented contents of the first audio signal buffer and the second audio signal buffer by using Henning window.

4. The communication device of claim 1, wherein the first audio signal is acquired from a near-end of the communication device.

5. The communication device of claim 1, wherein the communication channel comprises a wireless communication channel.

6. A method performed at a communication device for generating enhanced audio signals, the method comprising:
    acquiring a first audio signal buffer, wherein the first audio signal buffer comprises a noise signal;

receiving a second audio signal buffer, wherein the second audio signal buffer comprises a speech signal received at the communication device through a communication channel;

segmenting contents of the first audio signal buffer and the second audio signal buffer, the first audio signal buffer being continuously monitored and analyzed;

windowing the segmented contents of the first audio signal buffer and the second audio signal buffer;

calculate Linear Prediction Coding (LPC) coefficients of the first audio signal buffer;

calculate a LPC spectrum from the LPC coefficients;

calculate Fast Fourier Transform (FFT) of the second audio signal buffer;

calculate a FFT magnitude spectrum of the second audio signal buffer;

calculate a difference between the LPC spectrum and the FFT magnitude spectrum;

selectively boost frequencies of the second audio signal buffer by at least 3 decibels (dB) when the difference is greater than 5 dB to modify the FFT magnitude spectrum of the second audio signal buffer;

calculate an inverse FFT of the modified magnitude spectrum;

overlap and add the second audio signal buffer to generate a third audio signal buffer, wherein the third audio signal buffer is outputted by the earpiece, and wherein a memory is configured to store one or more of the first audio signal buffer, the second audio signal buffer, and the third audio signal buffer.

7. The method claim 6, further comprising window the segmented contents of the first audio signal buffer and the second audio signal buffer by using a Henning window.

* * * * *